(12) United States Patent
Robinson et al.

(10) Patent No.: US 9,047,758 B2
(45) Date of Patent: Jun. 2, 2015

(54) SOLAR POWERED ENERGY MODULE (71) Applicant: Dometic Corporation, Louisville, KY (US)

(72) Inventors: Gnana Jeevan Robinson, Fort Wayne, IN (US); Dale Malott, Middlebury, IN (US); Mike Hicks, Fort Wayne, IN (US); Alfred J. Haimbach, Jr., Elkhart, IN (US)

(73) Assignee: Dometic Corporation, Louisville, KY (US)

( * ) Notice: Subject to any disclaimer, the term of this patent is extended or adjusted under 35 U.S.C. 154(b) by 95 days.

(21) Appl. No.: 13/827,213

(22) Filed: Mar. 14, 2013

(65) Prior Publication Data
US 2014/0265941 A1 Sep. 18, 2014

(51) Int. Cl.
H04Q 9/00 (2006.01)
G08C 17/02 (2006.01)

(52) U.S. Cl.
CPC ..................................... *G08C 17/02* (2013.01)

(58) Field of Classification Search
CPC ........................................................ H01H 3/26
USPC ................................................ 318/16, 139, 3
See application file for complete search history.

(56) References Cited

U.S. PATENT DOCUMENTS

| | | | |
|---|---|---|---|
| 5,081,402 A | 1/1992 | Koleda | |
| 5,134,347 A | 7/1992 | Koleda | |
| 5,264,765 A | 11/1993 | Pecorino et al. | |
| 5,698,958 A | 12/1997 | Domel et al. | |
| 5,760,558 A | 6/1998 | Popat | |
| 5,847,525 A | 12/1998 | Cheron et al. | |
| 5,848,634 A | 12/1998 | Will et al. | |
| 5,990,646 A | 11/1999 | Kovach et al. | |
| 6,057,658 A | 5/2000 | Kovach et al. | |
| 6,181,089 B1 | 1/2001 | Kovach et al. | |
| 6,259,218 B1 | 7/2001 | Kovach et al. | |
| 6,369,530 B2 | 4/2002 | Kovach et al. | |
| 6,410,908 B1 | 6/2002 | Anderson et al. | |
| 6,484,069 B2 | 11/2002 | Osinga | |
| 6,732,018 B2 * | 5/2004 | Osinga | 700/275 |
| 6,812,397 B2 | 11/2004 | Lambey | |
| 6,812,662 B1 | 11/2004 | Walker | |
| 6,984,951 B2 | 1/2006 | Osinga et al. | |
| 7,151,464 B2 | 12/2006 | Ramus | |
| 7,389,806 B2 | 6/2008 | Kates | |
| 7,728,542 B2 * | 6/2010 | Bruno et al. | 318/469 |
| 7,786,623 B2 * | 8/2010 | Farmer et al. | 307/117 |
| 8,009,433 B2 | 8/2011 | Ares | |
| 8,575,877 B2 * | 11/2013 | Liu | 318/480 |
| 2005/0034374 A1 | 2/2005 | Ebbe et al. | |
| 2005/0039861 A1 | 2/2005 | Faludy et al. | |

(Continued)

OTHER PUBLICATIONS

International Search Report and Written Opinion for corresponding PCT Application No. PCT/US2014/027728. Jul. 21, 2014.

*Primary Examiner* — David S Luo
(74) *Attorney, Agent, or Firm* — Middleton Reutlinger (57) ABSTRACT

Embodiments of a solar powered energy module are provided wherein a solar powered module may be added to a building or vehicle which is self-powered and need not be connected to the existing power system of the building or vehicle. The solar powered energy module may be utilized to power an awning or other desirable features.

26 Claims, 7 Drawing Sheets

(56) References Cited

U.S. PATENT DOCUMENTS

| | | |
|---|---|---|
| 2005/0072532 A1 | 4/2005 | Holden et al. |
| 2005/0161067 A1 | 7/2005 | Hollins |
| 2006/0000558 A1 | 1/2006 | Fennell |
| 2006/0086874 A1 | 4/2006 | Habel et al. |
| 2006/0185799 A1 | 8/2006 | Kates |
| 2007/0240832 A1 | 10/2007 | Cavaree |
| 2008/0163984 A1 | 7/2008 | Lambey |
| 2010/0186908 A1 | 7/2010 | Meadows, Jr. et al. |

* cited by examiner

SOLAR POWERED ENERGY MODULE

STATEMENT REGARDING FEDERALLY SPONSORED RESEARCH

None.

REFERENCE TO SEQUENTIAL LISTING, ETC.

None.

CLAIM TO PRIORITY

None.

BACKGROUND

1. Field of the Invention

Present embodiments relate to a module for use with a recreational or sport vehicle, including but not limited to RVs and boats or other structures, mobile or fixed, which may utilize an awning assembly. More specifically, present embodiments are related to a solar powered energy module which is utilized with at least an awning assembly to power the awning assembly between extended and retracted positions.

2. Description of the Related Art

There are various types of retractable awning assemblies that are mounted to recreational vehicles, sport vehicles, including watercrafts, and buildings. These awnings provide a sheltered area which is shaded or protected from rain or UV exposure and an additional outdoor living space which is especially desirable for people who utilize recreational vehicles regularly and who enjoy the use of outdoor patios.

The awning assemblies typically have structures which are mounted to the wall of the RV or building structure. Awning assemblies typically have a roller assembly which is retracted when the awning is not in use and which is extended when the awning is utilized to provide a shaded, sheltered area.

One continuing goal in the assembly of awnings is a desire to reduce installation time and cost associated with the installation. Additionally, many awning assemblies are manual powered and it has become desirable for owners of manual awning assemblies to change over to powered systems. However, with regard to installation of powered awning assemblies or change from manual to powered systems, the cost and time required to do so is greatly dependent upon the connection of the wiring system for the awning assembly to the existing electrical system of the recreational vehicle, sport vehicle or building structure. It is highly desirable to avoid costs and time requirements associated with connection of the two electrical systems either as an OEM installation or aftermarket installation of powered awnings, or the change/upgrade from manual to powered awning assembly.

Accordingly there is a need in the art for a structure to power a powered awning assembly without the need for connecting the power systems for the awning to the power system for the remainder of the vehicle or structure. It would also be desirable to provide a system which is environmentally friendly and limits the use of natural resources in providing the power for the awning system.

SUMMARY

According to some embodiments, a solar powered energy module for use with a recreational vehicle, boat or building comprises a control module having at least one solar collector cell, a battery in electrical communication with the solar collector cell, a printed circuit board having a remote sensor, the battery connected to the printed circuit board, a motor for driving an awning assembly between a retracted position and an extended position, the motor in electrical communication with the printed circuit board, a remote control in wireless communication with the remote sensor, the remote control having at least one button for extending and retracting the awning assembly. The solar powered energy module wherein the remote control may be infrared or radio frequency. The solar powered energy module further comprising a primary connector and wherein the primary connector may receive at least one cable for powering the motor. The solar powered energy module wherein the at least one cable also sends a control signal for the motor. The solar powered energy module further comprising a secondary connector capable of recharging the battery or powering alternate electronics. The solar powered energy module further comprising a vibration sensor to limit operation of the awning when in motion. The solar powered energy module further comprising an accelerometer to limit operation of the awning when in motion. The solar powered energy module further comprising a switch in electrical communication with the control module. The solar powered energy module wherein the electrical communication be one of wired or wireless.

According to some embodiments, a solar powered energy module for controlling and powering an awning assembly comprises a module having at least one solar cell in electrical communication with a printed circuit board, a rechargeable battery in communication with the circuit board, a remote control sensor in communication with the printed circuit board, a primary connector in communication with the printed circuit board to receive power from the battery, the connector in electrical communication with an awning motor, a remote control in optical communication with the remote control sensor. The solar powered energy module wherein the module has a door for replacement of rechargeable batteries. The solar powered energy module wherein the remote control is one of radio frequency or infrared. The solar powered energy module further comprising a secondary connection for powering auxiliary components. The solar powered energy module further comprising a cable connecting the motor to the printed circuit board.

According to some embodiments, a solar powered energy module for controlling and powering an awning assembly for use with an RV, boat or stationary structure comprising a module having at least one solar cell in electrical communication with a printed circuit board, a rechargeable battery in communication with the circuit board, a remote control sensor in communication with the printed circuit board, a primary connector in communication with the printed circuit board to receive power from the battery, said connector in electrical communication with an awning motor, a plurality of solar cells in communication with the rechargeable battery, one of a switch or remote in communication with the module for actuating the awning assembly. The solar powered energy module wherein the switch is inside the RV. The solar powered energy module wherein the switch being outside the RV. The solar powered energy module wherein the remote control is one of infrared or radio frequency. The solar powered energy module further comprising a flap switch over a remote sensor window. The solar powered energy module further comprising an environmental sensor assembly. The solar powered energy module wherein the assembly has a detector for at least one of wind velocity, rain detection, temperature and lighting condition. The solar powered energy module further comprising a communication portion including at least one of a cellular or satellite modem. The solar powered energy module further comprising a communication portion including at least one of wi-fi or Bluetooth communication module. The solar powered energy module wherein the communication portion is in communication with appliances inside the RV or stationary structure.

BRIEF DESCRIPTION OF THE DRAWINGS

In order that the embodiments may be better understood, embodiments of the solar powered energy module will now be described by way of examples. These embodiments are not to limit the scope of the claims as other embodiments of the solar powered energy module will become apparent to one having ordinary skill in the art upon reading the instant description. Non-limiting examples of the present embodiments are shown in figures wherein:

DETAILED DESCRIPTION

It is to be understood that the Solar Powered Energy Module is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numeral indicate like elements throughout several views, there are shown in FIGS. 1 through 7 various embodiments of a solar powered engine module for use with an awning assembly. The solar powered energy module is self-powered to operate the awning assembly. The solar powered energy module powers a motor which drives the awning between extended and retracted positions and may include features to inhibit deployment of the awning when the vehicle is in motion.

Figure 1:
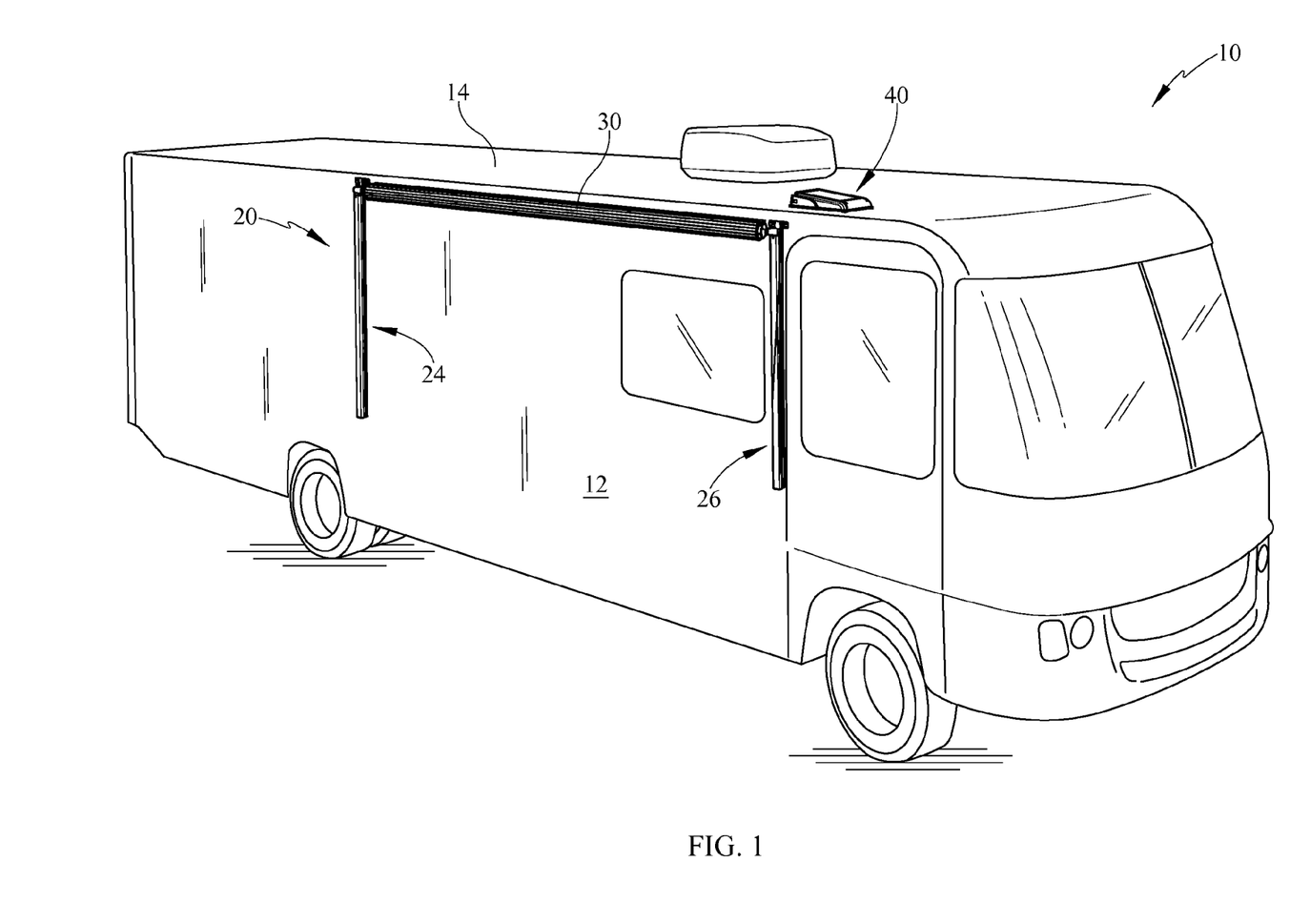
FIG. 1 is a perspective view of an exemplary embodiment of a solar powered energy module for use with an awning assembly on a recreational vehicle.

Referring now to FIG. 1, a perspective view of a recreational vehicle ("RV") 10 is depicted. The RV 10 includes an engine and transmission, not shown, as well as a sidewall 12 and a roof 14. Additionally, the RV may be in the form of a non-powered, pull-behind camper. An awning assembly 20 is connected to one of the sidewall 12 or the roof 14 of the vehicle 10. In further embodiments, the awning assembly 20 mounted on the roof, may be recessed, or may be retractable within the sidewall so as to reduce the airflow interference of the assembly while the vehicle 10 is being operated. In still an alternate embodiment, module components may be housed within the awning structure, housing or case.

The awning assembly 20 includes an awning or canopy 22 (FIG. 5), at least one first arm 24 and at least one second arm 26. The awning or canopy 22 includes a first side edge 32, a second side edge 34, a first inner edge 36 and a second outer edge 38. The awning 22 is exemplary and other variations may be utilized. For example, cassette awnings may have arms which are integral with a case structure.

Figure 5:
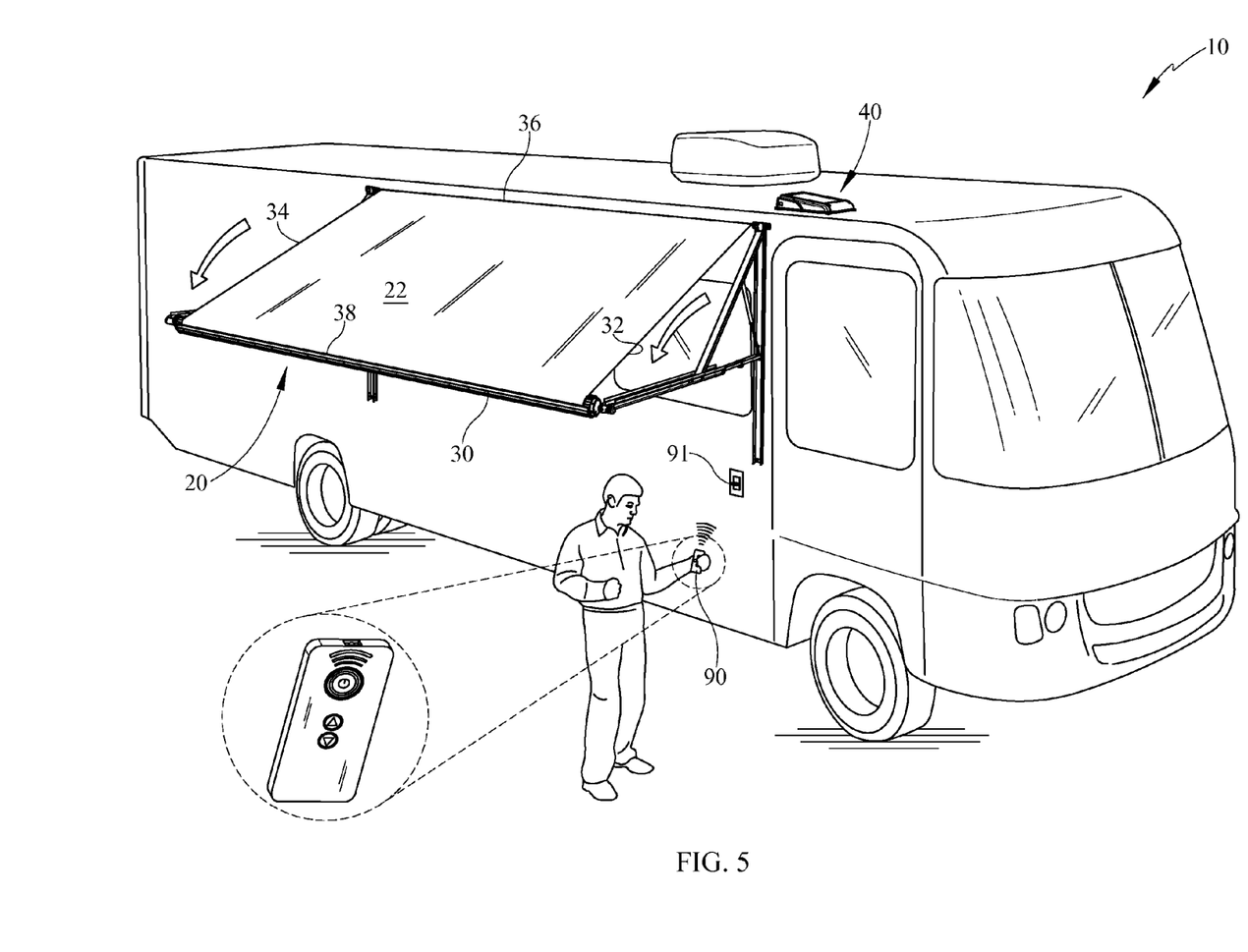
FIG. 5 is a perspective view of a user with a remote in communication with the solar powered energy module to extend the awning assembly depicted on the recreational vehicle.

Referring still to FIG. 1, the assembly 20 further includes a roller assembly 30 which moves inwardly and outwardly corresponding to retraction or extension of the awning 20 to provide the sheltered or shaded area beneath the canopy 22 (FIG. 5). The roller assembly 30 may be an automated system powered for example by electric, AC or DC, air, hydraulic or other fluid power systems to cause extension or retraction of the canopy 22. The awning assembly 20 further comprises an awning rail assembly which may connect the awning assembly 20 to the sidewall 12 of the vehicle.

It should be understood that although an RV is referred to in the exemplary embodiments, one skilled in the art should understand that the use of the solar powered energy module 40 is not limited to these recreational vehicles. The solar powered energy module 40 may be used with homes or other stationary buildings or structures as well as boats or other marine application for example which use canopy structures which may or may not be retractable and need electricity for operations such as lighting, commercial vehicles, agricultural vehicles, horse trailers, and temporary structures such as those used at sports events, (tailgating) and flea markets.

On the roof 14 of the RV 10 is a solar powered energy module 40 which functions to receive solar energy and convert such to charge batteries within the module 40. According to some alternatives, the solar powered energy module 40 may also be mounted on the sidewall or other locations of an RV or other structure for example if the location is preferable for a particular need. The module is electrically connected to a motor within the awning roller 30 to drive the awning assembly 20 between the retracted position shown and an extended position depicted in FIG. 5. A wire or cable may extend along an edge of the awning, for example along a seam, to the motor in the awning roller 30. The module 40 receives communication from a remote 90 (FIG. 5) which is utilized by a user to operate the awning assembly 20 as described. The module 40 does not need to be connected to the electrical system of the RV 10 and therefore, installation time is significantly decreased as well as costs associated with such installation. The system may be sold for after-market usage or may be installed on newly manufactured RVs 10. In either event, the system allows for easy usage of a powered awning assembly 20 while limiting the need to connect power systems for driving the awning assembly 20 to wiring harnesses and more complicated electrical systems of the RV 10.

Figure 2:
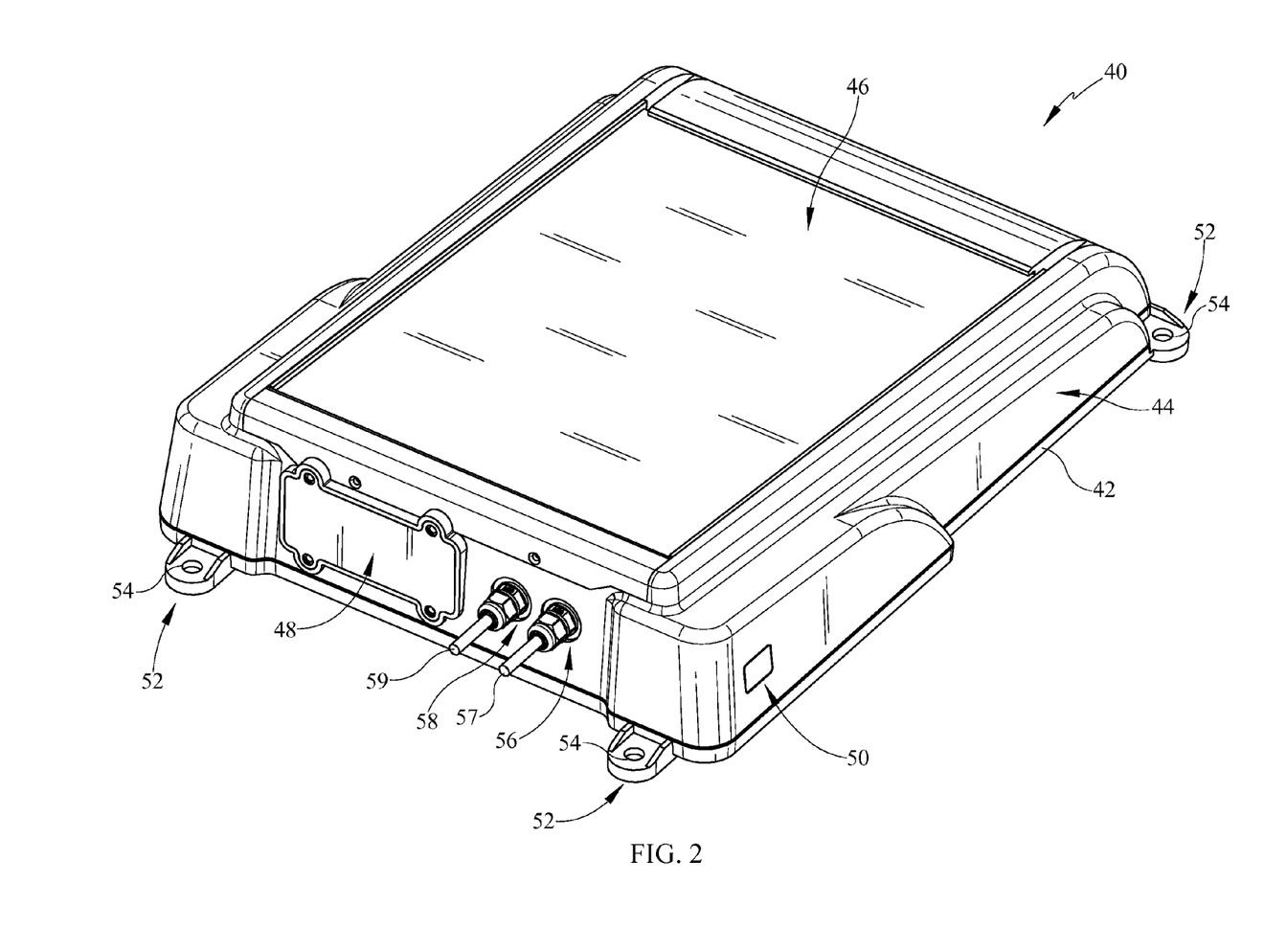
FIG. 2 is a perspective view of the solar powered energy module removed from the recreational vehicle.

Referring now to FIG. 2, a perspective view of an exemplary solar powered energy module 40 is depicted, removed from the vehicle 10. The module 40 includes a housing base 42 and a housing cover 44 positioned on the base 42.

Figure 3:
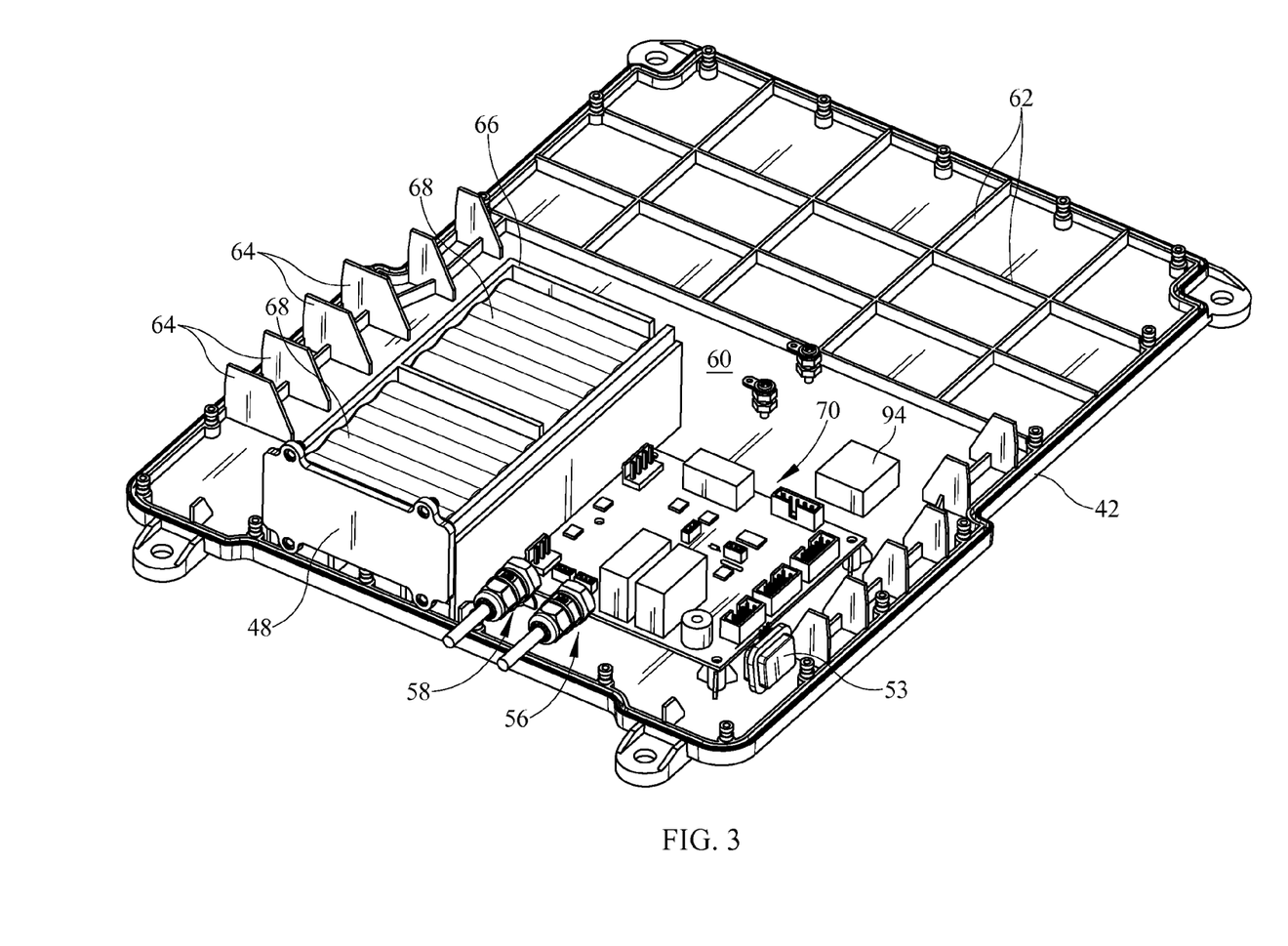
FIG. 3 is a perspective view of the solar powered engine module of FIG. 2 with the upper housing removed to depict the layout of the components within the module.

Although the exemplary embodiment is depicted of a base and cover, the housing may be a one piece structure or may be defined by two or more structures. This cover 44 and base 42 may be formed of various materials, including but not limited to rigid plastics or the like and may be treated for ultraviolet light resistance to inhibit fading and structural degradation. One end of the module 40 is curved for appearance and to improve aerodynamics of the module 40 atop a moving vehicle, however, such feature is not a necessity and may be removed. Along the upper portion of the cover 44 is at least one solar cell 46 which collects solar energy and converts such solar energy to electricity to recharge batteries within the module 40. Along a side of the cover 44 is a door 48 which may be removed to access a battery tray or housing 66 (FIG. 3). The battery housing 66 retains rechargeable batteries which are charged and discharged during operation of the module 40 and powered awning assembly 20. The door 48 may be connected to the housing in a variety of fashions. For example, as depicted, fasteners are utilized to position the door 48 in a watertight configuration inhibiting weather damage to the interior components of the module 40 by environmental rain, snow, or other contaminants. Alternate assembly means may be utilized to ensure that the door 48 is tightly positioned within or against the housing and may be sealed and retained in different fashions. According to some embodiments, the housing 66 is connected to the door 48 so that removal of the door 48 causes removal of the housing 66.

The module 40 further comprises a remote sensor window 50. The remote sensor window 50 allows communication with remote control sensor 53 (FIG. 3) on the interior of the housing through the housing cover 44. Also, positioned on the housing base 42 are a plurality of feet 52. Each of the feet 52 according to the exemplary embodiment comprises fastener holes or apertures 54 which are utilized to fasten the module 40 to the roof 14 of the RV or other structure near the power awning assembly 20.

The module 40 also comprises a first connector 56 located within the housing 44. This first or primary connector 56 is utilized to connect a cable 57. The cable 57 includes at least one wire for powering and/or controlling the motor of the power awning assembly 20. For example, the cable may be a wire which solely provides power as a means of controlling, or may be one or may include separate power and control functionality. Alternatively, the cable 57 may include one or more wires which are disposed within a wire housing or sheath and extends to the motor of the powered awning assembly 20 which may include a ground wire or alternatively may be grounded in alternate path. The cable 57 should be capable of repeated rolling with the awning assembly. Similarly, a second connector 58 is utilized to connect a second cable 59. The second connector 58 and cable 59 may be used as an alternative power source for the motor and to charge the battery in the event the battery is low in charge and cannot operate the awning. By providing an alternate connector to power the assembly 20. Additionally, the second connector 58 and cable 59 may be utilized to power auxiliary devices such as LED lighting for the awning or other features.

Referring now to FIG. 3, the module 40 is shown with the housing cover 44 removed. The base 42 is depicted having a plurality of strengthening ribs 62 extending from a floor 60. The base 42 also comprises a plurality of strengthening fins 64 along the peripheral edge of the base 42 to inhibit deflection of the vertical walls of the housing cover 44 (FIG. 2) providing some rigidity for the module 40. A battery tray or housing 66 is positioned on the base 42 and provides at least one compartment for rechargeable batteries. The battery housing 66 includes three side walls wherein a fourth wall is defined by the door 48. Accordingly, removal of the door 48 allows access to the rechargeable batteries 68 for replacement when the batteries become unusable, or for complete removal of the housing 66 from the module 40. Alternatively, the batteries could be within a compartment created by the housing and a door could be used to access and replace the batteries. According to a further embodiment, the module 40 could be disassembled to replace the batteries.

Adjacent to the battery housing 66 are the primary and secondary connectors 56, 58 which are in electrical communication with a printed circuit board 70. The printed circuit board 70 provides the logic controllers, processors, chips and connectors for receiving power from the solar cell 46 or auxiliary wiring to charge the batteries 68 as well as control and direct power to the awning assembly 20. A remote sensor 53 is depicted adjacent to the printed circuit board 70 and is located in a position adjacent to the remote sensor window 50 of FIG. 2.

Figure 4:
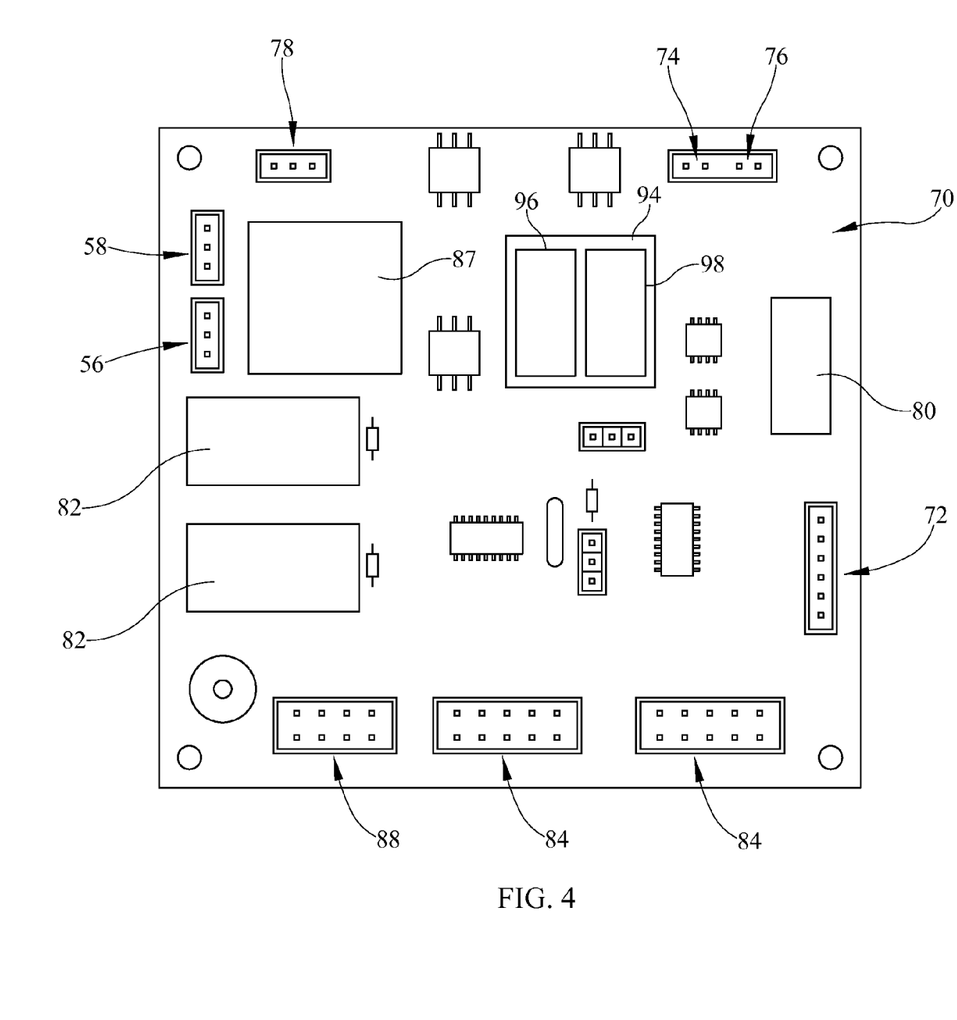
FIG. 4 is a top schematic view of a printed circuit board utilized with the solar powered energy module.

Referring now to FIG. 4, a schematic view of the printed circuit board 70 is depicted for description of the control of the powered awning assembly 20. The printed circuit board 70 includes the primary and secondary connectors 56, 58 which provide power to the awning assembly 20 and the potential for powering other components such as, for non-limiting example, LED lighting. Additionally, the secondary connector 58 may be used, for non-limiting example, to power other features or components when no solar source is present or batteries are depleted. A connector 72 is provides electrical communication with the batteries 68. Power through this connector 72 is provided by a connection 74 to the solar cell collector 46. An adjacent pair of pins 76 may provide a backup charge.

The printed circuit board 70 also includes a remote control sensor connector 78. The connector is utilized with the remote control sensor 53 (FIG. 3). The board 70 may also utilize a fuse 80 as well as one or more relays 82. The printed circuit board 70 may also include at least one connector 84 for providing firmware updates to the battery management or other firmware such as logic controls located on the circuit board.

Figure 6:
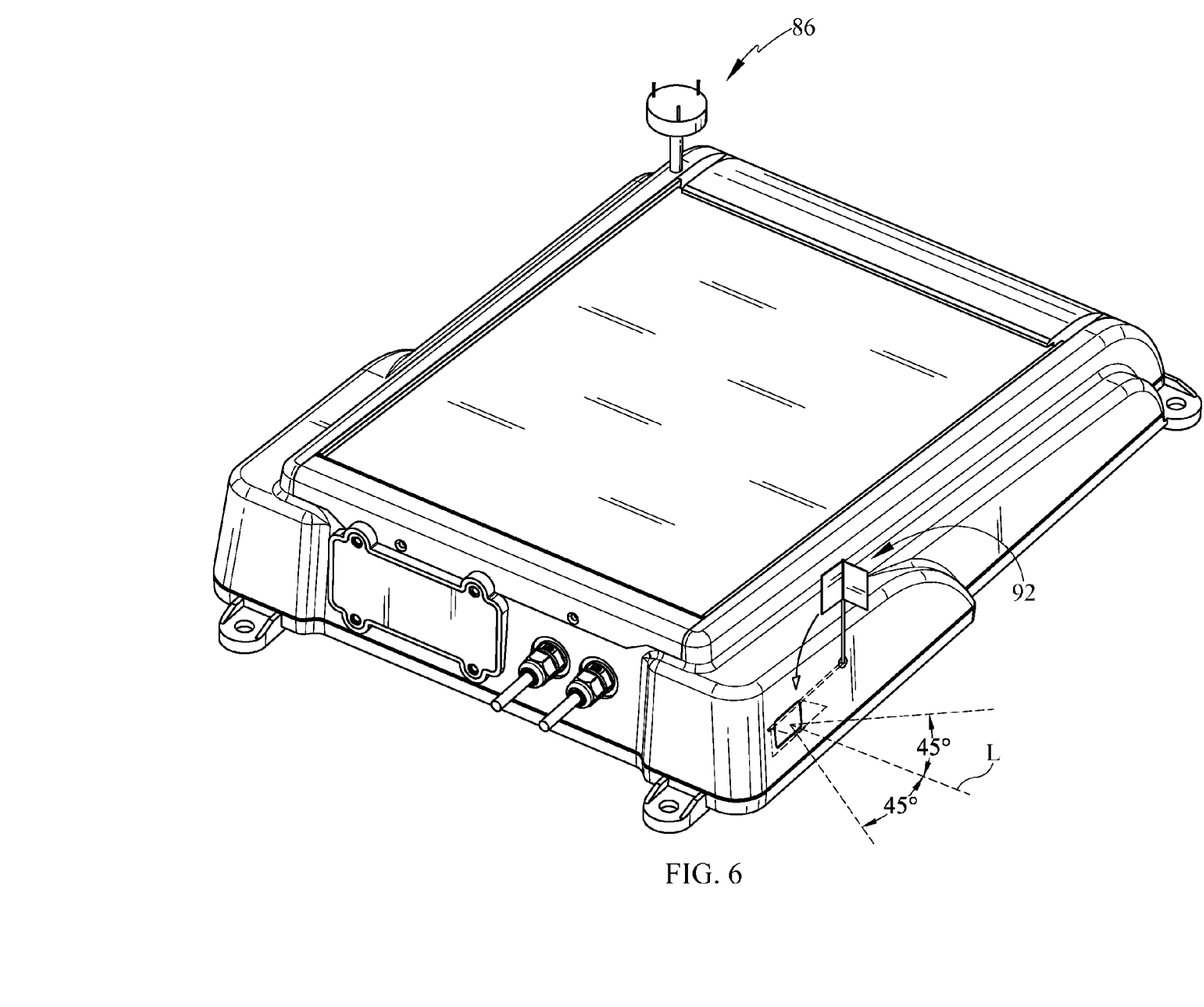
FIG. 6 is a module with optional sensor structures which may be utilized in combination with the solar powered energy module to provide optional features.
Figure 7:
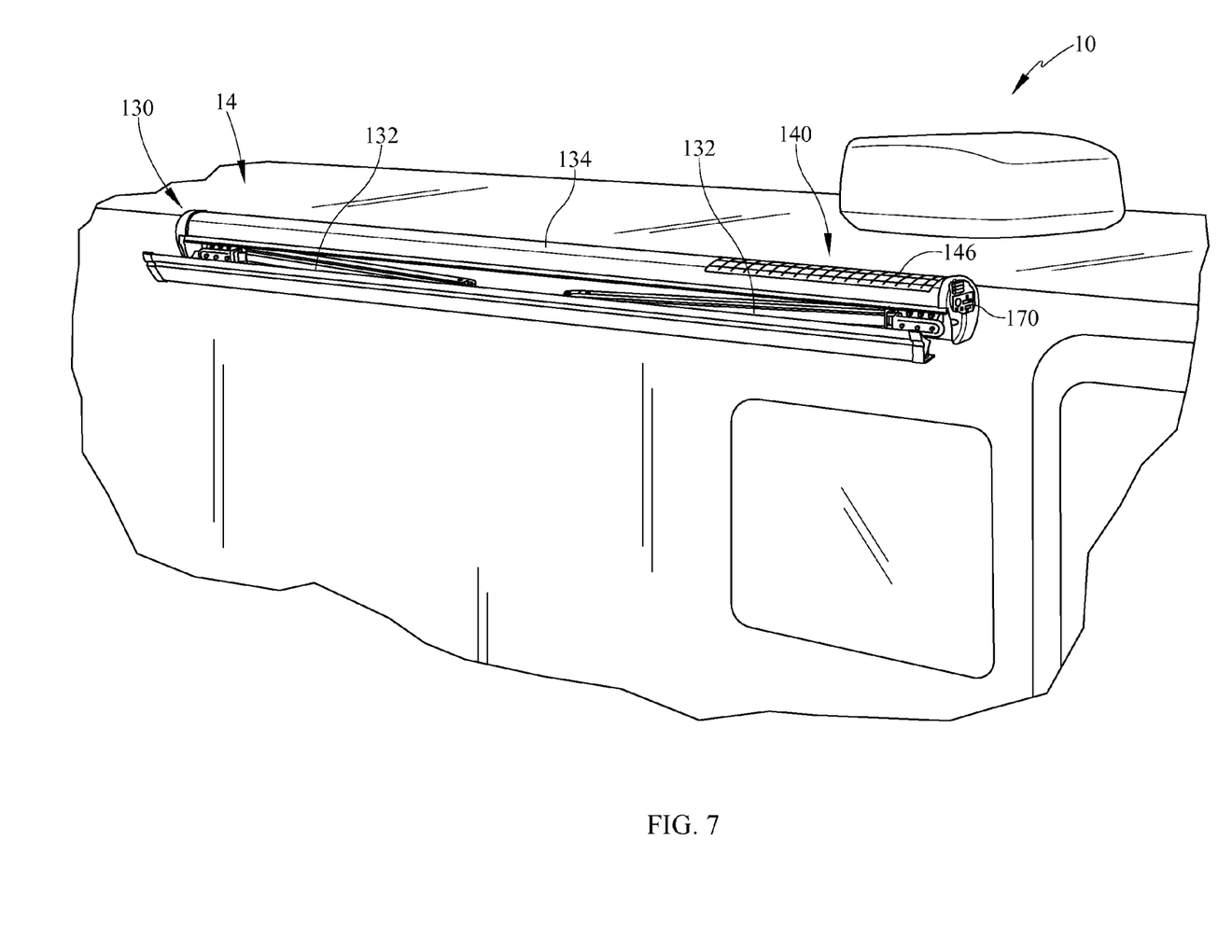
FIG. 7 is an alternate awning type which may be utilized with the solar powered energy module housed therein.

Referring now to FIG. 5, the vehicle 10 is shown with the awning assembly 20 being extended. A user is grasping a remote control 90 which sends a signal to the module 40. The module 40 receives the signal from the remote 90 and causes actuation of the awning assembly 20 to the extended position, or retracted position. The batteries 68 (FIG. 3) drive the motor of the awning assembly within the roller tube 30. According to one embodiment, the remote control 90 utilizes an infrared signal which is directed to the window 50 (FIG. 2) of the module 40. The sensor 53 (FIG. 3) inside the window 50 is capable of receiving signal within an angle of about 90° as measured from a horizontal line L extending perpendicular from the window surface, as shown in FIG. 6. In other words, 45 degrees above this line L and 45 degrees below the imaginary line L extending from the surface of the window 50 and rotated about the line L 360 degrees. However, this is merely one non-limiting example and other ranges may be utilized. Additionally, in one infrared embodiment, the remote 90 requires line of sight communication with the window 50 and sensor 53 therein. Utilizing such line-of-sight remote control ensures that the remote cannot be utilized from inside the vehicle 10 or any location which is out of line-of-sight, while the vehicle is in motion, to deploy the awning assembly 20. The remote 90 may have a maximum operating range, for non-limiting example, of up to about 20-25 feet which also ensures that a user must be close enough to the device to prevent accidental deployment of the awning assembly 20.

The use of infrared and this limited operating range also eliminates the need for wiring the module to an ignition interlock for the RV 10 or other vehicle or structure which again limits the costs and time related with installation of the device.

As an alternative to the infrared sensor described, a radio frequency (RF) sensor may be utilized to control the awning assembly 20. The RF signal may be transmitted through walls and some barrier objects in order to communicate between the remote 90 and the module 40. Since such communicating through walls and objects is capable, an RF sensor may further utilize an accelerometer or vibration sensor 87 or other means to inhibit deployment of the awning assembly 20 if the vehicle is in motion. When the RF sensor receives a signal from the remote 90, the printed circuit board would require communication with such vibration sensor or accelerometer 87 (FIG. 4) and if the vehicle is determined to be in motion, than the awning assembly 20 would not deploy.

As a further alternative a switch 91 may be utilized inside the vehicle or structure or alternatively, the switch 91 may be connect to a remote transmitter. The switch 91 may alternatively be located at an external location, such as a sidewall or on an arm of the awning assembly and again may be either of hard wired or connected to a remote which signals the module 40.

Referring now to FIG. 6, various alternative or optional embodiments are depicted. For example, when using IR remote control and sensor, the module 40 may include a flap switch 92 over window 50. The flap switch 92 may be biased, such as by spring or other urging mechanism, in order that the flap is normally in the open position which is shown in solid line. However, when the vehicle 10 is in motion, the flap switch 92 closes due to wind pressure, shown in broken line. With the flap switch closed, the remote sensor 53 is not capable of communication with the remote control 90.

As a further alternative, an environmental condition sensor assembly 86 could be mounted on the module 40 or remotely mounted and connected through, for example, connector 88 or alternatively wirelessly communicate. Such sensor 86 could be utilized to determine wind speed or velocity, rain detection or lighting condition. For example, a wind sensor could be a mechanical wind sensor or an ultrasonic wind sensor. This wind sensor could be may be located on top of the solar powered energy module 40 which is mounted on the roof 14 of the vehicle 10 or could be mounted remotely and wired to the module or communicate wirelessly by a plurality of known standards. When the sensor 86 detects a wind velocity of a preset value, the awning assembly would either be closed or inhibited from being opened until the sensor detected an acceptable value below the preset wind velocity.

Additionally, rain sensors may be utilized to detect heavy rain and close the awning before it is subject to high stress and collapse due to water pressure on the awning surface 22 (FIG. 5). These rain sensors could be integrated into the module 40 and sensor assembly 86 or remotely located and in communication with the module 40. Solar and temperature sensors may be utilized as well so that once temperature reaches a present value near the module 40, or in the area of a patio where the awning assembly 20 would be deployed, the awning would automatically deploy to keep this front patio area cool. This may be used in conjunction with a solar sensor to determine light intensity and these values may be programmed to require preselected amounts of intensity and certain temperature maximums or minimums in order to deploy the awning.

According to further embodiments, a communications portion 94 may be located on the printed circuit board 70 as shown in FIG. 4. The communications portion 94 may include a cellular or satellite modem 96 (FIG. 3) to provide information to the user with regard to wind velocity, temperature, awning and other statuses. The communications portion 94 may further comprise a bluetooth module 98 to communicate with other components of the RV, for example, air conditioning, refrigeration, slide outs, security cameras for systems, the awning assembly 20 or other devices including smartphones, tablets, pads or personal computers. Optionally, a communications module may be utilized which is commercially known, for example, as ZIGBEE module, or of the ZIGBEE alliance, to aid with multi-appliance communications. The communications portion 94 may additionally be located external to the board 70 as shown in FIG. 3.

The module 40 may be integrated for use with smartphones, pads and computers by way of application or app. The module 40 may provide customized access through the use of the smartphone via a satellite or cellular phone modem 96 located in the module 40. The functions provided through such may be unlimited but may include operation of the awning assembly 20, communication with the air conditioning system to control temperature within the RV, control position of a slide out, control lights either under the awning or within the RV. Additionally, sensors may communicate conditions near the RV via the app. Such conditions may be wind velocity, temperature and light intensity as previously described via sensors on board the module. Smoke and carbon monoxide sensors may also be integrated within the module to communicate by way of this app to the user. Likewise, security systems such as cameras or other break-in deterrent features may be integrated within the app to provide notifications to a user if sensors are triggered or if a camera is activated, for example, by motion detection around the RV. As discussed previously, the module 40 may be programmable through connectors on the printed circuit board.

Additionally, one skilled in the art should understand that the awnings described and shown in these embodiments are not limiting in nature but merely exemplary. For example, alternative awning types, such as, but not limited to, cassette awnings are within the scope of the present invention. With brief reference to FIG. 7 a cassette awning 130 is shown mounted on an exemplary RV. The cassette awning embodiment utilizes arms 132 which are integral to the awning case structure. Cassette awnings 130 generally utilize arms assemblies 132 which have a scissor action to deploy and extend an awning or canopy. These cassette awnings 130 are generally mounted to the roof of an RV 10 so that the awning and arms assemblies 132 are generally cantilevered when extended. According to the instant embodiment, a case 134 may have solar panels or cells 146 formed therein. Additionally, as shown at the cut-away end cap, control components for the solar power energy module 140 may be housed within the case 134. For example, a printed circuit board 170 and batteries may be housed within at various locations including but not limited to the end cap area of the case, as depicted.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. The solar powered energy module for use with a recreational vehicle, boat or building, comprising:
    a control module having at least one solar collector cell said control module being positioned exteriorly of said recreational vehicle, boat or building;
    a battery in electrical communication with said solar collector cell;
    a printed circuit board in said control module having a remote sensor, said battery connected to said printed circuit board;
    a motor disposed at an awning assembly for driving said awning assembly between a retracted position and an extended position, said motor in electrical communication with said printed circuit board of said control module wherein said motor is powered by one of said battery and said solar collector cell of said control module; and,
    a remote control in wireless communication with said remote sensor in said control module, said remote control having at least one button for extending and retracting said awning assembly;
    said control module having at least one of a sensor or flap switch to inhibit unintentional deployment of said awning assembly.

2. The solar powered energy module of claim 1, said remote control being infrared.

3. The solar powered energy module of claim 1, said remote control being radio frequency.

4. The solar powered energy module of claim 1 further comprising a primary connector.

5. The solar powered energy module of claim 4, said primary connector receiving at least one cable for powering said motor.

6. The solar powered energy module of claim 5, said at least one cable also sending a control signal for said motor.

7. The solar powered energy module of claim 5 further comprising a secondary connector capable of recharging said battery or powering alternate electronics.

8. The solar powered energy module of claim 1 further comprising a vibration sensor to limit operation of said awning when in motion.

9. The solar powered energy module of claim 1 further comprising an accelerometer to limit operation of said awning when in motion.

10. The solar powered energy module of claim 1 further comprising a switch in electrical communication with said control module.

11. The solar powered energy module of claim 10, said electrical communication being one of wired or wireless.

12. A solar powered energy module for controlling and powering an awning assembly, comprising:
- an exterior mounted control module having at least one solar cell in electrical communication with a printed circuit board and a rechargeable battery in communication with said printed circuit board;
- a remote control sensor in said control module and in electrical communication with said printed circuit board;
- a primary connector disposed in said control module and in communication with said printed circuit board to receive power from said battery, said connector in electrical communication with an awning motor to power said awning motor and extend or retract said awning assembly;
- a remote control in wireless communication with said remote control sensor;
- said module further comprising at least one of a sensor or a flap switch to inhibit unintentional deployment of said awning assembly.

13. The solar powered energy module of claim 12, said module having a door for replacement of rechargeable batteries.

14. The solar powered energy module of claim 12, said remote control being one of radio frequency or infrared.

15. The solar powered energy module of claim 12 further comprising a secondary connector for powering output when a solar source is not available.

16. The solar powered energy module of claim 12 further comprising a cable connecting said motor to said printed circuit board.

17. A solar powered energy module for controlling and powering an awning assembly for use with an RV or stationary structure, comprising:
- a module having at least one solar cell in electrical communication with a printed circuit board, a rechargeable battery in communication with said circuit board, said module being positioned on an exterior of said RV or stationary structure;
- a remote control sensor disposed within said module and in communication with said printed circuit board;
- a primary connector on-board said module and in communication with said printed circuit board to receive power from said battery, said primary connector in electrical communication with an awning motor;
- a plurality of solar cells in communication with said rechargeable battery;
- one of a switch or remote in communication with said module for actuating said awning assembly;
- at least one of a sensor or a flap switch within said module which inhibits unintentional deployment of said awning assembly.

18. The solar powered energy module of claim 17, said switch being inside said RV, boat or stationary structure.

19. The solar powered energy module of claim 17, said switch being outside said RV, boat or stationary structure.

20. The solar powered energy module of claim 17, said remote control being one of infrared or radio frequency.

21. The solar powered energy module of claim 20 further comprising said flap switch disposed over a remote sensor window.

22. The solar powered energy module of claim 17, further comprising an environmental sensor assembly.

23. The solar powered energy module of claim 22, said assembly having a detector for at least one of wind velocity, rain detection, temperature and lighting condition.

24. The solar powered energy module of claim 17, further comprising a communication portion including at least one of a cellular or satellite modem.

25. The solar powered energy module of claim 17, further comprising a communication portion including at least one of wi-fi or Bluetooth communication module.

26. The solar powered energy module of claim 25, said communication portion in communication with appliances inside said RV or stationary structure.

* * * * *